No. 854,216. PATENTED MAY 21, 1907.
E. A. HOWE.
HAT FRAME FORMER.
APPLICATION FILED NOV. 12, 1906.
2 SHEETS—SHEET 1.
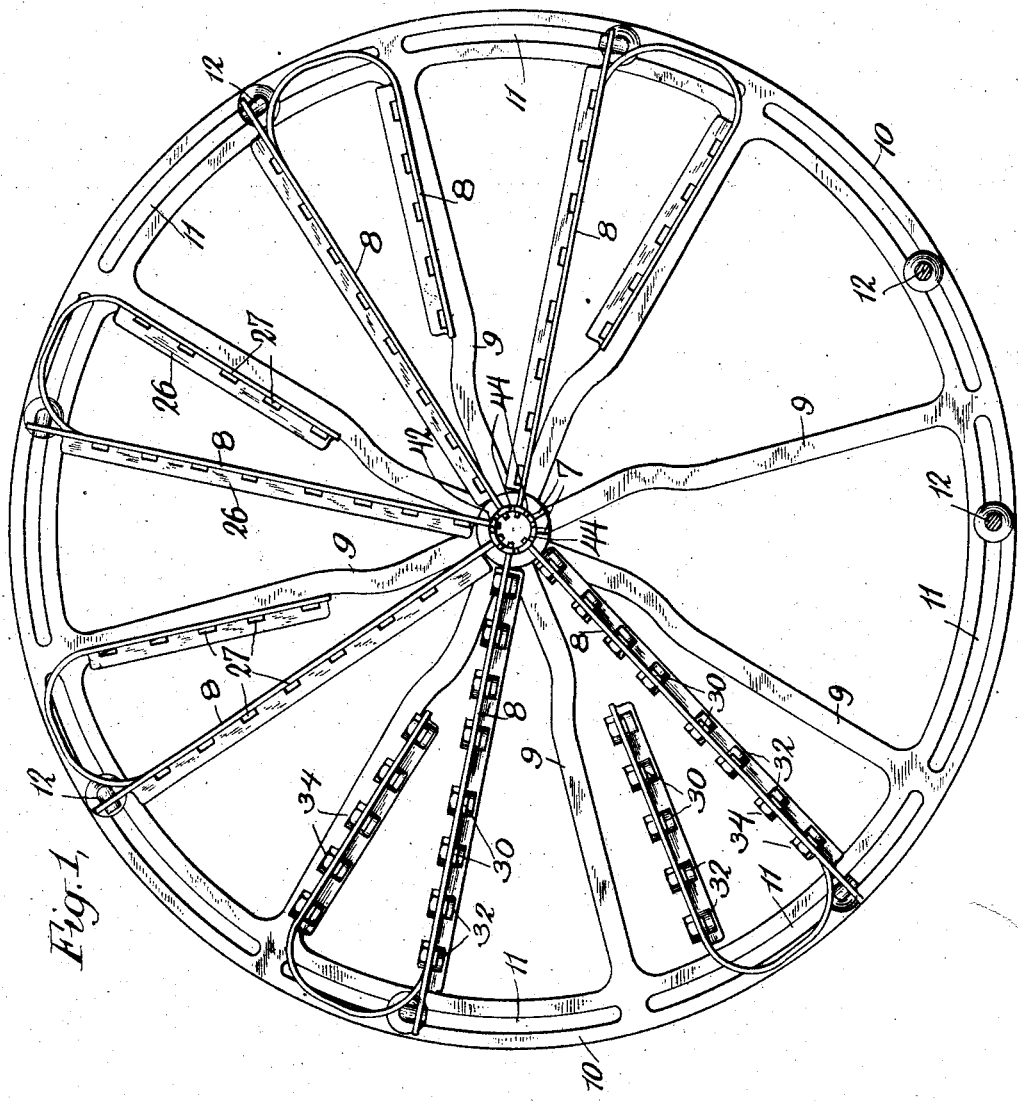
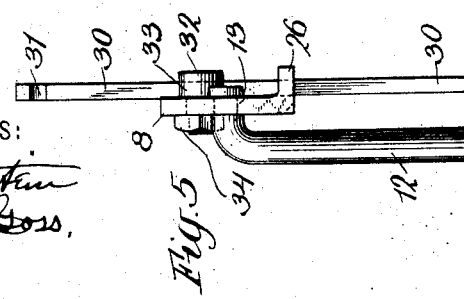
WITNESSES:
INVENTOR
Edward A. Howe.
BY
ATTORNEY

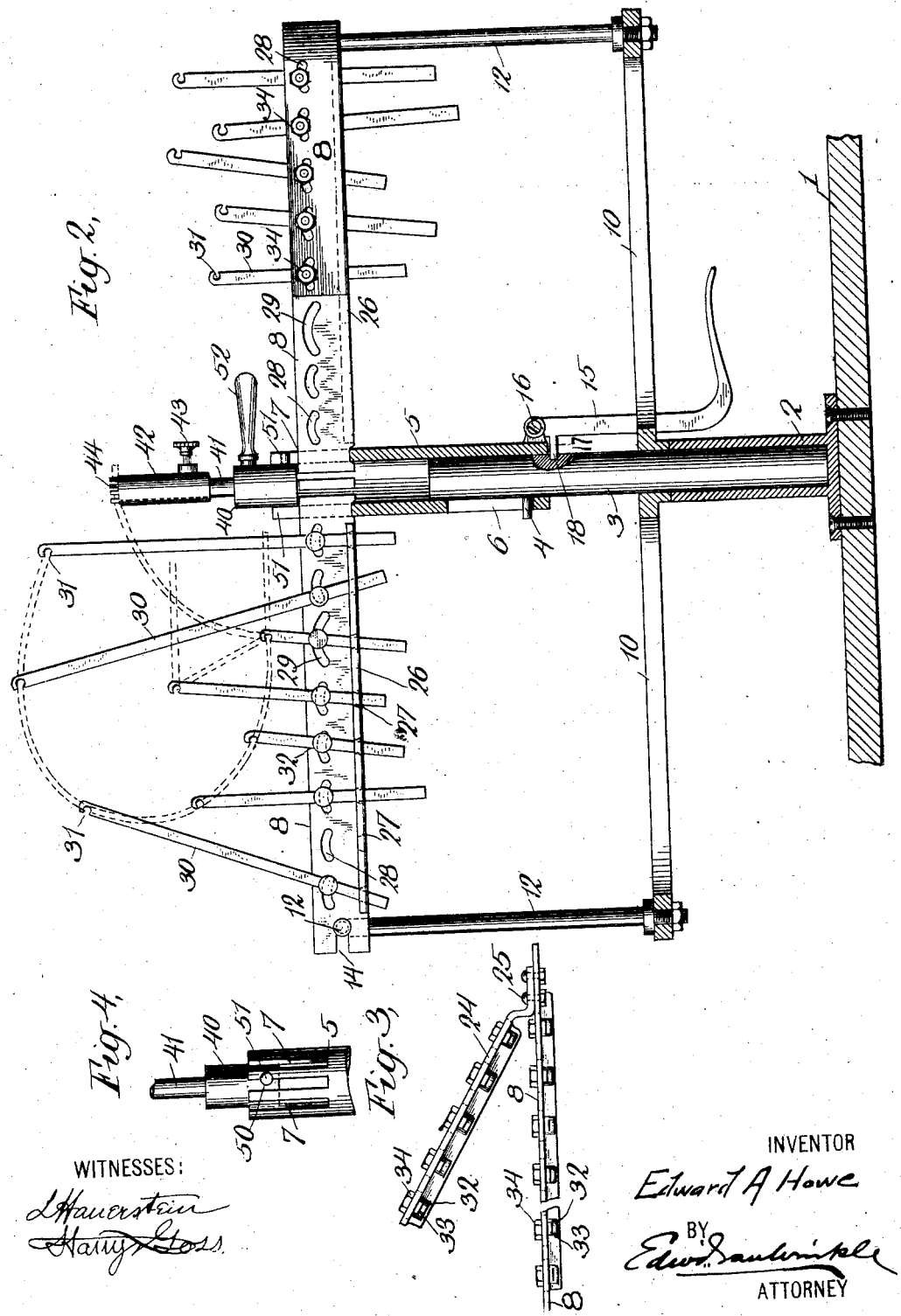

UNITED STATES PATENT OFFICE.

EDWARD A. HOWE, OF NEW YORK, N. Y.

HAT-FRAME FORMER.

No. 854,216.  Specification of Letters Patent.  Patented May 21, 1907.

Application filed November 12, 1906. Serial No. 343,130.

*To all whom it may concern:*

Be it known that I, EDWARD A. HOWE, a citizen of the United States of America, residing in the borough of Manhattan, city, county, and State of New York, have invented certain new and useful Improvements in Hat-Frame Formers, of which the following is a specification, reference being had therein to the accompanying two sheets of drawings, in which—

Figure 1 is a plan view of my hat former. Fig. 2 is an elevation of same in part section. Fig. 3 shows a modification of my clamping arm illustrated in Figs. 1 and 2. Fig. 4 is an enlarged detail of retaining plug and center directing pin. Fig. 5 is an enlarged view of my upright supports 12 and wire supporters 30. Fig. 6 is an enlarged detail of binding bolt 32.

1 is the top of a table or work bench, 2 is a socket secured thereto, 3 is a round vertical member adapted to engage the socket 2 and rotate therein. Securely fastened to the member 3 is the circular member 10 with offset spokes 9 and circumferential slots 11 near its periphery in which are fastened the upright supports 12 provided with a recess 13 near their upper ends.

Slidably mounted on member 3 is the tubular member 5 provided with a slot 6 adapted to engage pin 4 in member 3, the purpose of which is to limit the motion of member 5, as will be readily understood. On the upper end of member 5 radial slots 7 are provided to receive the ends of the clamping arms 8. On the lower end of member 5, pivotally mounted at 16, is the lever 15, provided with the pin 17 adapted to engage a hole 18 in the member 3 and thereby hold the tubular member 5 in its normally highest position. When the pin 17 is withdrawn the member 5 will drop by gravity, as will be readily understood.

In my invention I employ radially arranged clamping arms provided with means for supporting converging rows of wire holders or wire supporters and in the illustrations I have shown two methods employed. The purpose of these converging rows of wire holders is to provide a means for supporting the round-and-round wires of a hat frame that is fluted or scalloped, at present the prevailing style. In Figs. 1 and 2 the member 8 is curved so that it presents two faces that converge, and in Fig. 3 I employ two separate converging pieces 8 and 24 bolted together by means of the bolts 25. On the extreme outer end of my clamping arm 8 I provide a slot 14 adapted to engage recess 13 of upright supports 12. The inner end of clamping arm 8 is provided with a notch adapted to engage the slots 7 of the tubular member 5. The clamping arms consist of a plate 8 provided with flange 26, segmental slots 28 in the vertical portion of the plate 8 and slots 27 in flange 26 are uniformly spaced throughout the entire length of arm 8. Bolts 32 provided with slots 33 and nuts 34 pass through the slots 28.

In my present invention my wire holders 30 consist of a single piece of flexible wire, rectangular in cross section, provided at or near its upper extremity with a notch or recess 31, the lower end passing through the slots 33 in bolts 32 and the slot 27 in the flange 26. It will be readily understood that the adjustment of these wire supporters is limited only by length of slot 28 in which the bolts 32 slide and that they may be securely fastened in their adjusted position by tightening the nuts 34. In each of the arms 8 a slot 29 is provided which is somewhat longer than the slots 28, the function of which is to permit greater adjustment of the particular wire supporter fastened by bolt 32 passing through this slot. This wire supporter is for the head size round-and-round wire.

By referring to Fig. 1 it will be readily understood that the upright supports 12 may be secured in position in slots 11, thereby directing the radial arms as desired. The slots 7 are wide enough to permit this universal circumferential adjustment.

The retaining plug 40 is provided with lock pins 51 which are adapted to engage notch 50 in member 5 and may be turned into and out of engagement by means of the handle 52. The upper end of retaining plug 40 is a center directing pin 41 on which is movably mounted a tubular member 42 provided with a set screw 43 and radial slots 44 cut across the top. The member 42 may be adjusted vertically and held in adjusted position by the set screw 43. The function of the slots 44 is to hold into position the cross wires of a round crown hat frame.

In practice, to set up a hat shape on my present device, I adjust the wire holders which are fastened by bolts 32 passing through the slots 29 in arm 8 so that they will hold the head size wire of a pattern hat and support the hat. The slot 29 permits adjustment of head size. Then adjust the upright supports 12 so that the clamping arms 8 have the same direction as the cross wires of the pattern hat. Hang all the wire supporters 30 in their proper position on the round-and-round wires of the pattern hat frame, and tighten all the nuts 34. Withdraw the pin 17 from hole 18 and allow the former to collapse and release the pattern hat. Then raise up the former in its normally highest position and place pin 17 in engagement with hole 18. The former is now in position to duplicate the pattern hat. In constructing a hat frame, place all the round-and-round wires in the wire supports and secure the same in place. The fore-and-aft wires or cross wires are then wound around the round-and-round wires and follow the direction of the clamping arms, making the brim and crown. In that manner an exact duplicate of the pattern hat may be produced.

I wish it distinctly understood that my hat frame former herein illustrated and described is in the form which I desire to construct it, and that any changes or variations may be made as may be convenient or desirable without departing from the salient features of my invention and I therefore intend the following claims to cover such modification as naturally fall within the lines of invention.

Having thus fully described my invention, what I claim as new and desire to secure by Letters Patent is,—

1. In a device of the class described, the combination of a flat circular member, provided with a series of perpendicular supports at or near its outer diameter; radially arranged clamping arms, each pivotally connected at their outer ends to the aforesaid supports, and means to simultaneously raise and lower their inner ends.

2. In a device of the class described, the combination of radially arranged clamping arms each pivotally supported independently at their outer ends, means permitting independent circumferential adjustment of the clamping arms, and means to raise and lower the inner ends of the clamping arms simultaneously.

3. In a machine for making ladies' wire hat frames, radially arranged clamping arms each provided with a horizontal converging supporting arm.

4. In a machine for making ladies' wire hat frames the combination of a series of radially arranged arms each provided with a horizontal converging clamping arm and wire holders adapted to be held thereby.

5. In an adjustable form for making wire frames, the combination of wire supports with a series of radially arranged clamping arms each pivotally supported independently at their outer ends and adapted to hold a plurality of wire supports, means to hold the wire supports in the desired position, means permitting independent circumferential adjustment of the aforesaid clamping arms and a collapsible means to free the completed wire frame.

6. In a device of the class described, in combination, a rotatable support provided with circumferential slots, upright supports adapted to engage the aforesaid slots, a series of radially arranged clamping arms pivotally connected to the aforesaid upright supports, an upright central member provided with a reciprocable tubular member adapted to support the inner ends of the clamping arms, adjustable wire-holding devices carried by the clamping arms, and means to reciprocate and support the reciprocable tubular member.

7. In a machine for making wire hat frames in combination a series of radially arranged clamping arms provided with a series of segmental slots and a series of holes, bolts passing through the series of segmental slots and provided with slots, wire supporters passing through both the slots in the bolts and the holes in the clamping arms.

This specification signed and witnessed this 5 day of November, A. D., 1906.

EDWARD A. HOWE.

In the presence of—
EMMA HOWE,
EDW'D VAN WINKLE.